United States Patent
Hartmann et al.

(10) Patent No.: US 9,611,959 B2
(45) Date of Patent: Apr. 4, 2017

(54) COUPLING DEVICE

(75) Inventors: Juergen Hartmann, Mutterstadt (DE); Andreas Kaufmann, Speyer (DE); Stefan Gelbrich, Geithain (DE); Caroline Kauffmann, Roemerberg (DE)

(73) Assignee: PFW Aerospace AG, Speyer (DE)

( * ) Notice: Subject to any disclaimer, the term of this patent is extended or adjusted under 35 U.S.C. 154(b) by 364 days.

(21) Appl. No.: 13/542,989

(22) Filed: Jul. 6, 2012

(65) Prior Publication Data

US 2014/0008911 A1    Jan. 9, 2014

(51) Int. Cl.
| | |
|---|---|
| *F16L 21/02* | (2006.01) |
| *F16L 17/02* | (2006.01) |
| *F16L 21/06* | (2006.01) |
| *F16L 27/113* | (2006.01) |
| *F16L 23/00* | (2006.01) |

(52) U.S. Cl.
CPC ............. *F16L 21/02* (2013.01); *F16L 17/02* (2013.01); *F16L 21/06* (2013.01); *F16L 27/1133* (2013.01); *F16L 23/00* (2013.01)

(58) Field of Classification Search
CPC ......... F16L 23/00; F16L 17/025; F16L 21/02; F16L 13/146; F16L 17/02; F16L 27/1133; F16L 21/06
USPC ....... 285/364, 373, 224, 363, 420, 351, 347, 285/233
See application file for complete search history.

(56) References Cited

U.S. PATENT DOCUMENTS

| | | | | |
|---|---|---|---|---|
| 3,405,957 A | * | 10/1968 | Chakroff | ........................ 285/93 |
| 3,776,579 A | * | 12/1973 | Gale | ............................ 285/233 |
| 3,899,631 A | * | 8/1975 | Clark | .............................. 174/47 |
| 4,881,760 A | | 11/1989 | Runkles et al. | |
| 5,188,400 A | | 2/1993 | Riley et al. | |
| 5,402,831 A | * | 4/1995 | Hollis | ........................... 138/113 |
| 5,975,587 A | * | 11/1999 | Wood et al. | ................... 285/15 |
| 6,155,612 A | * | 12/2000 | Szabo | .......................... 285/319 |
| 7,284,731 B1 | * | 10/2007 | Johnson et al. | ............. 248/74.4 |
| 8,360,477 B2 | * | 1/2013 | Flynn | ..................... F16L 25/01 285/145.1 |
| 2012/0256416 A1 | * | 10/2012 | Ikeda et al. | .................... 285/365 |

FOREIGN PATENT DOCUMENTS

EP     390418 A2 *  10/1990

OTHER PUBLICATIONS

Tech Flex Solutions. PEEK speficifactions. Dec. 19, 2011.*

* cited by examiner

*Primary Examiner* — Gregory Binda
*Assistant Examiner* — Zachary Dragicevich
(74) *Attorney, Agent, or Firm* — Muncy, Geissler, Olds & Lowe, P.C.

(57) ABSTRACT

A coupling device for releasably connecting fluid-carrying duct ends of ducts is provided. The duct ends, respectively, each carry a jacket having at least two annular ribs housing a first annular sealing element. The first annular sealing element is engaged by the inner shell. The coupling device includes an outer shell that has radially inward extending ribs or rib portions, which are either arranged in an axial distance with respect to a further annular rib of the jackets or engage an axial recess provided on the jackets defined between the further annular rib and a fourth annular rib.

20 Claims, 7 Drawing Sheets

COUPLING DEVICE

BACKGROUND OF THE INVENTION

Field of the Invention

The present invention relates to a coupling device for releasably coupling fluid-carrying duct ends of ducts, particularly for use in aircraft or aerospace applications.

Description of the Background Art

U.S. Pat. No. 5,188,400 is related to a spring loaded coupling with a positive spring latch. This coupling device is used for releasably interconnecting confronting ends of first and second fluid carrying conduits. A pair of symmetrical arcuate coupling halves are preferably joint together at first adjacent ends for circumferentially surrounding the conduit ends. A latch is mounted adjacent the opposite end of one of the halves. This latch includes a flange having a slot opening outwardly and an outwardly extending flat spring lock terminating an end surface. A toggle is provided which has a first end pivotally adjacent the opposite end of the other of the halves. Further that toggle has a second end extendable longitudinal beyond the opposite end of the first of the halves. The toggle includes a locking pin adjacent the second end of the toggle engageable with the slot when the coupling halves are closed around the sleeve. That toggle includes a spring urging the toggle to pivot in a direction to move the locking pin into the slot. A cam is provided for rotating the toggle against the force of the leaf spring as the coupling halves are closed to cause the locking pin to clear the flange and drop into the slot to form a primarily lock. An aperture adjacent the second end of the toggle receive the spring lock which snaps into a lock position to form a secondary lock. The coupling may have spherical shoulders to reduce localized stresses and forces. Components of the spring loaded coupling scratch on the surface of the arcuate coupling halves, thus corrosion may occur on the arcuate coupling halves.

U.S. Pat. No. 4,881,760 is related to a conduit coupling device with redundancy features. According to this United Stated patent, a coupling assembly is disclosed for connecting adjacent ends of conduits, primarily used for aircraft fuel lines having redundant lock features. This coupling can be manipulated with one hand and includes a central tine and laterally spaced locking tines which engage a mating channel for locking the coupling in secured relationship. Indicia are provided across the locking tines which is not visible when the coupling assembly is completely and securely closed. The coupling assembly can be manipulated with one hand only and comprises viewing ports to be sure that all parts are in the place. Also the tines and guide members are configured to create a force between the two longitudinal components tending to open the assembly. Components of the spring loaded coupling scratch on the surface of arcuate coupling halves, thus corrosion may occur on the circumference surface of the arcuate coupling halves.

SUMMARY OF THE INVENTION

It is therefore an object of the present invention to provide a fluid-tight coupling device for releasably connecting fluid-carrying duct ends which is easily to be surveyed by the human eye without requiring complicated measuring devices, which is significantly reduced in its size and weight and which is easily to be mounted upon assembly of an aircraft or an aerospace vehicle.

According to an embodiment of the present invention, a coupling device is disclosed, which is used for releasably connecting confronting fluid-carrying duct ends of ducts in an aircraft or an aerospace vehicle. That duct ends each carry a jacket which is mounted tight to the duct ends. The jackets each comprise at least two annular ribs between which a first annular sealing element, such as an O-ring, is mounted which in turn is engaged on its upper side by an inner shell of the coupling device according to the present invention.

The coupling device can include an outer shell which may comprise two inter-connected shell sections, each having radially inwardly extending ribs or rib sections, which are either arranged in an axial direction of a further annular rib of that jackets, or, on the other hand, radially inwardly extending rib or rib sections engage an axial recess provided in that jacket, that axially extending recess defined between the further annular rib and an additional fourth annular rib provided on the jackets.

A solution according to an embodiment of the present invention allows the duct ends to relatively move with respect to each other without loosing the fluid tight connection, since—due to the axial distance between the ribs of the outer shell and the further rib on the jacket—an axial movement is feasible. In the alternative, inwardly extending radially ribs, preferably arranged at the end portions of the outer shell or that outer shell sections, respectively, may engage into a recess which is defined—in axial direction—between the further annual rib and an additional fourth rib arranged on the outer circumference of the jackets. Due to both alternatives of the present invention an axial movement of the confronting duct ends is feasible. This means, that a maximum gap width of a few millimeters can be allowed and as well as a "face to face"-arrangement between the duct ends in the mounted stage. Further to the relative movements within a horizontal plane, the solution according to the present invention allows for angled orientations of the duct ends with respect to one another. By this, mounting tolerances or the mounting of the coupling device according to the present invention is significantly easier, since duct ends can be mounted in an angled orientation with respect to one another, which is much more easier for the assembling personal to handle.

The coupling device according to an embodiment of the present invention, can include a second annular shaped sealing element which either is arranged on the outer circumference of the jacket or which may be provided on the inner conference of the jackets. In an alternative embodiment, both sealing elements, i.e. the first and the second annular shaped sealing element may be arranged on the outer circumference of the jackets, each of the sealing elements being housed by annular ribs and each of the sealing elements covered by an inner shell of the coupling device according to the present invention.

The duct ends and the jackets tightly arranged on the outer circumference of the duct ends can be manufactured of plastic material which allows for a significant reduction of weight of these components, when compared to solutions using metal components. Basically, the duct ends and the jackets tightly arranged on the outer circumference of the duct ends are made of a high-performance thermoplastic material such as PEEK and PPS to name but a few. The material chosen, i.e. the thermoplastic material is resistant against aggressive liquids and resistant in terms of not deformable with respect to a wide temperature range between −50° C. and 100° C. The high performance plastic material may be reinforced by fibers or by glass fibers to give an example.

Preferably, the outer shell is made of two shell sections which are connected with one another within connecting regions. To achieve this, the shells made of plastic material are provided with elastic hook-shaped elements which snap into openings of the complementary shell section to be connected with. To increase mechanical stability of the coupling device the outer shell or the outer shell section, respectively, surround the inner shell of the coupling device in its entirety i.e. about 360°, seen in circumferential direction. In its mounted stage, the outer shell is surrounded by at least one or two cable ties which may easily be fixed around the outer circumference of the outer shell and exert a significantly clamping force onto the coupling device in its mounted stage. The shells are like parts, i.e. the shell, being clamped identical, each being provided with an opening on one end and on the other hand having an elastically hooked-shaped element.

To allow for an easy inspection of the connecting areas between confronting duct ends which are fixed by the coupling device according to the present invention, the outer shell may comprise on its outer circumference a number of openings. The openings allow for an easy inspection of the inner shell. The inner shell may comprise on its outer circumference a ribbed structure on the one hand to reduce weight and on the other hand to reinforce the component. Depending on the ribbed structure being formed on the outer circumference the mechanical reliability or the mechanical rigidity of the component can be defined upon design thereof.

A further feature of the present invention worthwhile mentioning are the jackets which are tightly fastened on the circumference of the duct ends. To this end, the jackets may be laser welded with the duct ends or glued onto the duct ends. In the alternative a glue-fill-in-opening is provided on the circumference of the jackets to inject glue from the outer surface of jackets into the annular gap between the duct ends and the inner circumference of the jackets. The jackets comprise markers, which may be manufactured in a substantially triangular shape. This allows to identify the relative position of a jacket—which is tightly mounted on the circumference of the duct end—with respect to the coupling device. If a larger part of the markings being shaped in triangular fashion can be recognized by an inspection person, this indicates a larger gap width between the confronting duct ends connected by the coupling device. If, however, only a small part of the triangularly shaped markers, on both sides of the rim of the coupling device is visible for inspection persons, this indicates a stage of the confronting duct ends, which is close to a "face to face" position of the duct ends. Further, if only the markers of only one jacket of the duct ends is visible, and the markers of the opposite jacket of the respective opposite duct ends are not visible, indicates to an inspection personal, that the connection of both fronting duct ends is asymmetrical.

In each of the stages sketched above, the two annular sealing elements, i.e. commonly O-rings, manufactured of an elastic material, provide for a fluid tight connection of the fluid carrying duct ends even if the duct ends have moved with axial direction or in angular orientation with respect to one another. The axial length of the outer shell of the coupling device according to the present invention allows for axial displacement of the duct ends with respect to each other as well as of angular displacement of the duct ends to be releasably connected to one another.

Provided the components of the coupling according to the present invention are made of an electrically conducting material and provided the annular shaped O-rings feeding elements are made of an electrically conducting material, an electrical connection is established by means of the coupling according to the present invention. Likewise the coupling made of an electrically conducting material serves the purpose of an electrostatic discharging device. In contrast to coupling devices made of a metallic conductive material, which use generally flat rectangular connectors, this is not necessary with the coupling device according to the present invention, where the components form the electrical conductors themselves.

The coupling device according to the present invention allows for a much safer handling upon mounting, it is very flexible and may compensate for relative movements of the duct ends connected in a fluid-tight manner. The at least one cable tie arrangement is an additional safety feature, thus an unintentional opening of the coupling is prevented by, in case two cable ties, preferably made of plastic material, are used, redundancy is established as well. The high performance plastic material such as PEEK and PPS are very smooth, i.e. no solids tend to adhere and inner circumference of the ducts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 12.1-12.4 show different stages of axial displacements and angular displacements of the jackets and ducts, releasably connected by the coupling device according to the present invention.

DETAILED DESCRIPTION

Figure 1:
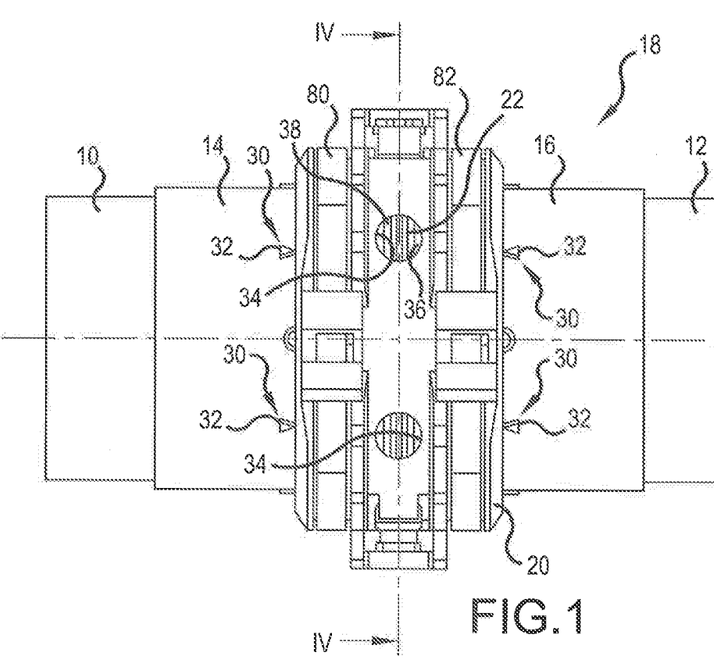
FIG. 1 shows a side view of a first embodiment of the coupling device according to the present invention.

FIG. 1 shows a side view of a first embodiment of the coupling device according to the present invention.

According to FIG. 1 a coupling device 18 according to the present invention releasably connects a confronting first duct end 10 with an oppositely arranged second duct end 12. The first duct end 10 and the second duct end 12 constitute the end portions of ducts—not shown in greater detail in FIG. 1—through which fluids such as fresh water, waste water, fuel or hydraulic fluid is transported within an aircraft or an aerospace appliance.

On the duct levels 10, 12 respectively, a first jacket 14 and a second jacket 16 are arranged tightly fitted, laser welded or by means of an adhesive or a glue. The duct ends 10, 12 constitute end portions of ducts made of a high-performance, non-metallic material such as PEEK or PPS.

According to the present invention, the jackets 14, 16 tightly arranged on the outer circumference of the first duct end 10 and the second duct end 12, respectively, are releasably connected by means of the coupling device 18. The coupling device 18, comprises an outer shell 20 made of a non-metallic material such as PEEK. The tight connection between the respective duct ends 10, 12 respectively and the jackets 14, 16, respectively, is established by means of gluing or welding, the techniques additionally provide for establishing an electrical conducting connection between the components if required.

The outer shell 20 may comprise a first outer shell section 66, and a second outer shell section 68, as shown in the view according to FIG. 2, further described below. The outer shells 66, 68 respectively, are in general identical parts, each having an opening 70 and a bent, elastically hook-shaped element 74, further described below. The outer shell, which may be preferably manufactured of a non-metallic material such as a high performance plastic material, surrounds an inner shell 22, which likewise preferably is made of a non-metallic material or which may be manufactured of a metallic material as well. The inner shell 22 of the coupling device 18 according to the present invention is only partially shown, since openings 34, a number of which is provided in the outer shell 20, allow visibility of the inner shell 22. The inner shell 22 is provided on its outer circumference 36 with a rib-structure 38, the rib structure 38 extending substantially in the circumferential direction of the inner shell 22 surrounded by that outer shell 20.

The first embodiment of the coupling device 18 according to the present invention comprises at least one cable tie arrangement 80, 82. To increase mechanical stability and rigidity of the coupling device 18, the coupling device 18 is—after been mounted on the jackets 14 and 16—pretensioned by the at least one cable tie arrangement 80, 82. At least one cable tie arrangement 80, 82 according to FIG. 2 comprises a cable tie end 26 and a cable tie cage 28 for tensioning the at least one cable tie 80, 82 and to compress the outer shell 20 of the coupling device 18. Still further in FIG. 1 it can be seen, that on the outer circumference the jackets 14, 16 respectively, markers 30 are provided. The markers 30 in the first embodiment of the coupling device 18 according to FIG. 1 have an substantially triangular shape 32, but alternatively may adopt another geometry. The markers 30 are provided on the outer circumference of the jackets 14 and 16 adopting an inclination angle so that they gradually protrude from the flat outer circumference of the sleeve-shaped jackets 14, 16. The markers 30 may be recessed or simply be painted on the surface of the jackets 14, 16, respectively as well.

By means of the markers 30 the relative position of the jackets 14, 16 towards the outer shell 20 of the coupling device 18 can be determined easily by inspecting personal. By means of the markers 30 a width of an insulation gap between the confronting duct can be checked and surveyed.

Figure 2:
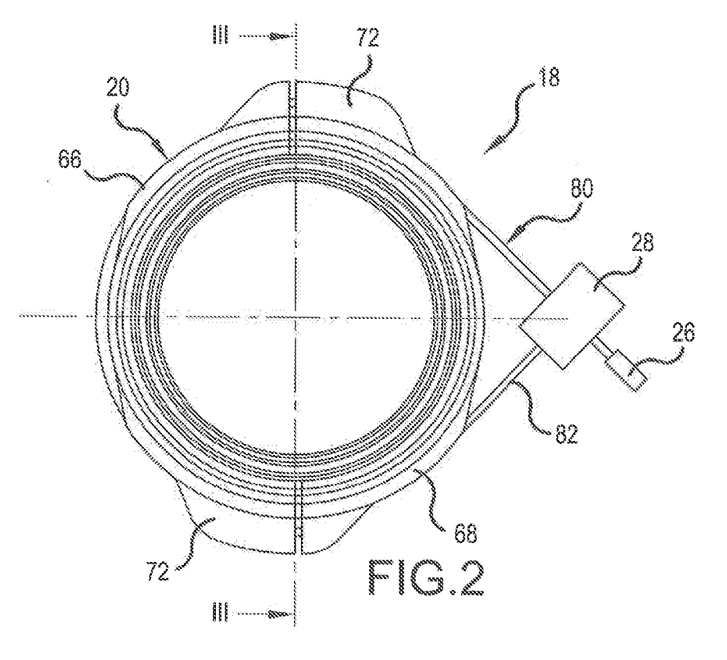
FIG. 2 shows a side view of the coupling device according to the first embodiment of the present invention.

FIG. 2 shows a side view of the first embodiment of the coupling device according to FIG. 1.

When seen from the left hand or right hand side, the first embodiment, of the coupling device 18 according to the present invention on its outer circumference comprises connecting regions 72, within which the outer shell sections 66, 68, respectively, are connected with each other. This is established by means of an elastically hook-shaped elements 74, which like a snap-in connection dive into openings 70—further described below—to tightly connect the outer shell sections 66, 68 with each other, resulting in an outer shell 20 surrounding the jackets 14, 16 about an angle of 360°. In the side view according to FIG. 2 it can be derived that the cable tie ends 26 are fixed by means of the cable tie cage 28. In general, the shell sections 66, 68 are identical components.

Figure 3:
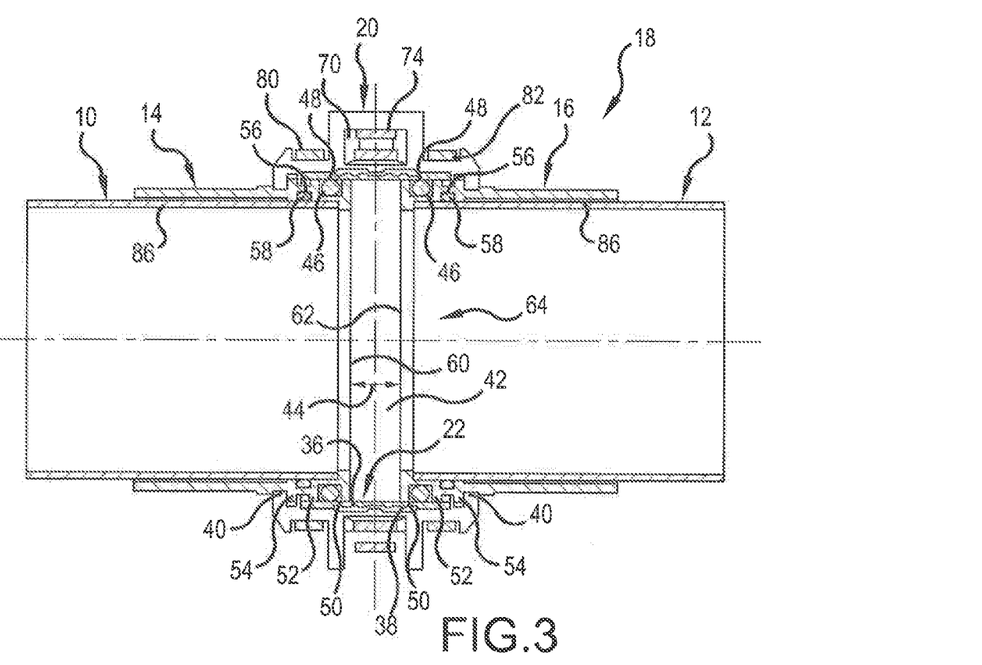
FIG. 3 shows a cross section of the first embodiment, the cross section indicated in FIG. 2.

FIG. 3 shows a cross section to the first embodiment in a horizontal plane according to FIG. 1.

According to FIG. 3 the jackets 14, 16, respectively, are securely fastened on the outer circumference of the duct ends 10, 12, respectively. The duct ends 10, 12 each comprise end faces 60, 62 which confront each other. In the embodiment shown in FIG. 3, there exists a gap 42 between the confronting end faces 60, 62. A gap width of the gap 42 is labeled with reference numeral 44.

In the cross section according to FIG. 3 each of the jackets 14, 16, comprises a first annular shaped sealing element 46. The first annular shape sealing element 46 is embedded between a first annular rib 50 and a second annular rib 52 provided on the outer circumference of the jackets 14, 16, respectively. The first annular rib 50 and second annular rib 52 define an outer recess 48 in which the first annular shaped sealing element 46 is arranged. The jackets 14, 16 furthermore, each may comprise an inner recess 56 in which a second annular shaped sealing element 58 is embedded. The second annular shaped sealing element 58 provides for a seal between the end portions of the duct ends 10, 12 and the jackets 14, 16 surrounding the duct ends 10, 12. The previously mentioned first annular shaped sealing element 46 provides for a sealing between the jackets 14 and 16 on the one hand and the inner shell 22 of the coupling device 18 on the other hand. As can be derived from the cross section to FIG. 3, the outer shell 20 having a first outer shell section 66 and a second outer shell 68, respectively, comprises on its circumference radially inward extending ribs or rib portions 40. The inner ribs or inner rib portions 40 are located at the axial ends of the outer shell 20 or outer shell sections 66, 68, respectively. The inwardly extending radial ribs or rib portions 40 are oriented within a distance from the further annular rib 54 i.e. a third annular rib, arranged on the outer circumference of the jackets 14, 16. Due to the distance between the further annular rib 54 on the one hand and the inner radial ribs or rib portions 40 extending from the inner circumference of the outer shell 20 on the other hand, an axial displacement between the duct ends 10,12 i.e. the endfaces 60, 62 is feasible. This allows for a relative movement of the duct ends 10, 12 i.e. the jackets 14, 16 with respect to one another. Due to the sealing elements i.e. commonly shaped as O-rings made of a material of an elastic material, even upon a relative movement of the duct ends 10, 12 with respect to one another, the fluid-carrying end ducts 10, 12 are sealed against the outer surrounding i.e. no fluid escapes via jackets 14, 16 between the circumferences of the jackets 14, 16 and the outer circumference of the end ducts 10, 12 due to the second annular shaped sealing element 58. No fluid escapes between the first annular shaped sealing element 46 arranged in the outer recess 48 of the jackets 14, 16 being covered by the inner shell 22 of the coupling device 18 according to the present invention.

Since a relative movement between the duct ends 10, 12 is feasible, mounting tolerances and/or tolerances which occur during operation of the duct ends 10, 12 i.e. the ducts being mounted in an aircraft, can easily be compensated for, without a leakage of liquid out of the coupling device 18 in its first embodiment according to the present invention.

Figure 4:
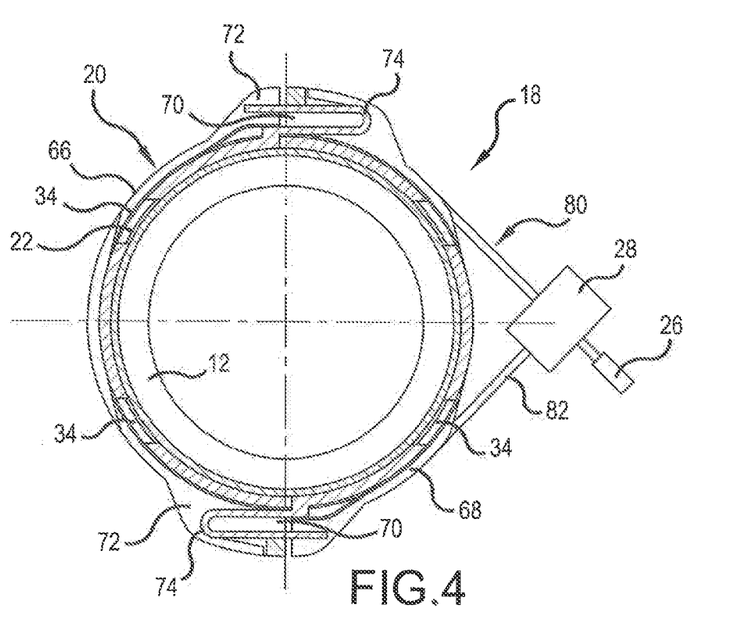
FIG. 4 shows a cross section of the first embodiment of the coupling device according to cross section IV-IV indicated in FIG. 1.

FIG. 4 shows a cross section of the first embodiment of the coupling device 18 according to the present invention along the line IV-IV in FIG. 1.

In the cross section according to FIG. 4 the outer shell 20 is formed by the first outer shell section 66 and the second outer shell section 68 which are engaged with one another within the connection regions 72 as previously mentioned in connection with FIG. 2. According to the cross section in FIG. 4 each of the outer shell sections 66, 68, respectively, comprises a hook-shaped element 74 and an opening 70. Upon engagement of both outer shell sections 66, 68 with one another, the elastic hook-shaped element 74 of one of the outer shell sections 66, 68 engage a respective opening 70 of the other of the outer shell sections 66, 68, thus forming an entire outer shell 20 completely surrounding the jackets 14, 16 about 360°.

The engagement of both outer shell sections 66, 68 is secured by the at least one cable tie 80, 82 the end portions 26 of which are engaged by a cable tie cage 28. Upon connection of the outer shell sections 66, 68 with one another, the connection is secured by means of at least one cable tie 80, 82. In the cross sections according to FIG. 4 the outer shell 20 i.e. the outer shell sections 66, 68 each have a number of openings 34 through which the inner shell surface 36 of the inner shell 22 is visible for inspection purposes, for instance to check that the inner shell 22 is installed correctly.

Figure 5:
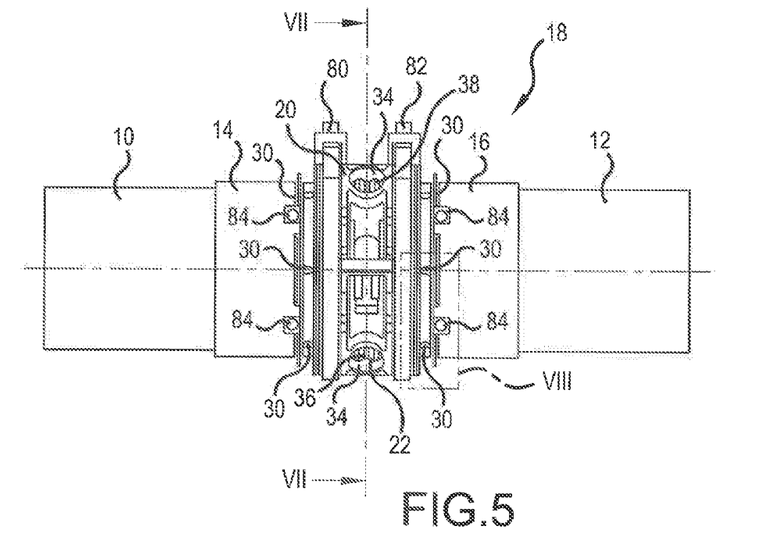
FIG. 5 shows a second embodiment of the coupling device of the present invention using two cable ties.

FIG. 5 shows a second embodiment of the coupling device 18 according to the present invention in a side view.

According to FIG. 5 on the duct ends 10, 12 each a jacket 14, 16 is mounted. Both duct ends 10, 12 i.e. the first and second jackets 14, 16 are releasably connected to one another by means of the coupling device 18. The coupling device 18 comprises the outer shell 20 as previously mentioned, comprising interconnected outer shell section 66, 68. By means of openings 34 the inner shell surface 36 of the inner shell 22 is visible.

The second embodiment of the coupling device is secured by means of a first and a second cable tie arrangement 80, 82, respectively. Details of the second embodiments are given according to the cross section VII-VII in FIG. 5, in FIG. 7, as described below.

In the side view according to FIG. 5, on the outer circumference of the jackets 14, 16 markers 30 are placed, having in principle a triangular shape 32 as previously discussed in connection with FIG. 1. By means of the markers 30, which may be positioned in inclined angle on the outer circumference of the jackets 14, 16 or may be simply printed or painted on the surfaces of the sleeve shaped jackets 14, 16, respectively, a respective width of an insulation gap between the confronting duct ends 10, 12 can be determined and surveyed by inspection personnel. The markers 30 in the embodiment according to FIG. 5 have a substantially triangular shape, but it is conceivable as well to shape them in a different geometry. The openings 34 provided in the outer shell 20 allow for visibility of the outer surface of the inner shell 22. The inner shell comprises a mantle 36 having a ribbed structure 38 the ribs extending substantially in circumferential direction. The ribbed structure 38 on the outer circumference of the inner shell 20 defines mechanical rigidity of the inner shell 22 which can be made of high-performance plastic material such as PEEK or PPS or of metal material. As can be derived from FIG. 3 concerning the first embodiment and the embodiment given in FIG. 5, the adhesive or glue 86 is injected by means of glue-fill-in-openings 84 provided on the outer circumference of the jackets 14, 16, respectively. By an injection tool the glue 86 is injected in the gap between the inner circumference of the jacket 14, 16, respectively and the outer surface of the duct ends 10, 12, respectively. Alternatively, a tight fit of the jackets 14, 16, respectively on the outer surfaces of the duct ends 10, 12 can be achieved by a laser welding or by welding.

Figure 6:
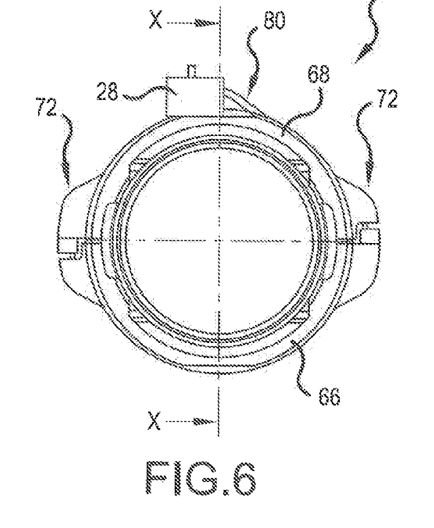
FIG. 6 shows a side view of the second embodiment of the coupling device according to the present invention.

FIG. 6 shows a side view of the second embodiment of the coupling device 18 according to the present invention, given in FIG. 5.

FIG. 6 reveals, that the outer shell 20 comprises a first outer shell section 66, and a second outer shell section 68 engaged with one another within a connecting region 72. Reference numeral 28 identifies a cable tie cage within a first cable tie 80 being pretensioned, so that the first outer shell section 66 and the second outer shell section 68 are secured in circumferential direction, to prevent the assembly of unintentional opening.

Figure 7:
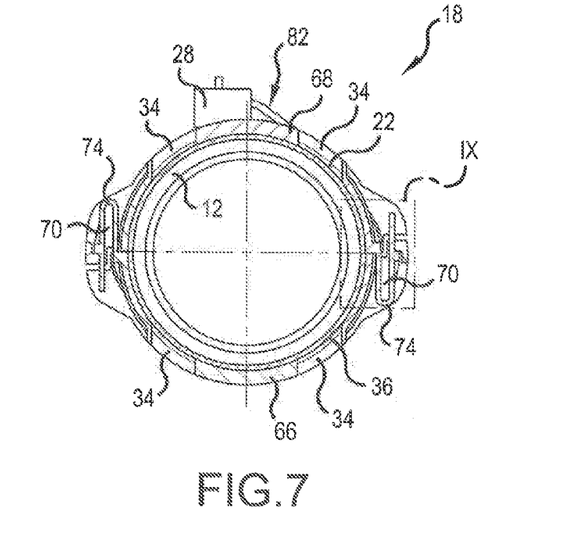
FIG. 7 shows a cross section according to VII-VII through the second embodiment of the coupling device as indicated in FIG. 5.

FIG. 7 shows a cross section through the coupling device 18 according to the cross section VII-VII as shown in FIG. 5.

According to the cross section given in FIG. 7, the first outer shell section 66 and that second outer shell section 68 are engaged within each other by means of the elastic hook-shaped element 74 engaging a respective opening 70 of the respective other one of the outer shell sections 66, 68. In the cross section given in FIG. 7, the outer shell sections 66, 68, respectively, comprise openings 34 through which the inner shell surface 36 of the inner shell 22 is visible. The inner shell's 20 outer surface 36 comprises a ribbed-structure 38 extending substantially in circumferential direction, defining a required mechanical rigidity. The cable tie's 80, 82, being pretensioned in circumferential direction by means of the cable tie cage 28, provide for a tight fit between the first outer shell section 66, engaging the second outer shell section 68, i.e. resulting in an outer shell 20 surrounding the jackets 14, 16, respectively, about 360° to be releasably connected with one another.

Figure 8:
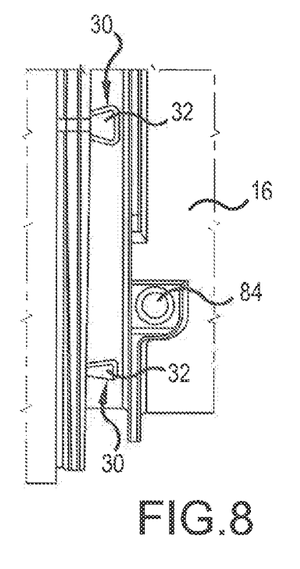
FIG. 8 shows a further detail of the second embodiment given in FIG. 5.

FIG. 8 shows, that on the second jacket 16 i.e. on the surface thereof, markers 30, having an substantially a triangular shape 32 are provided. The markers 30 have a shape which can be characterized, by that they protrude from the outer circumference of the second jacket 16 in radial direction Instead of being in triangular shape, protruding in an inclination angle radially away from the surface of the jackets 14, 16, respectively, the markers 30 may be printed onto the surface or simply painted. Both alternatives are conceivable as well. By reference numeral 84 glue-fill-in-openings are identified by means of which a glue or an adhesive is injected by an injection tool into a gap which the jackets 14, 16 on the one hand are tightly connected to the duct ends 10, 12 on the other. A glue or adhesive material is given in FIGS. 10 and 3, respectively, labeled with reference numeral 86. By means of this material the mechanical tight fit between the outer jackets 14, 16, respectively, on the inner circumference thereof with the duct ends 10, 12, respectively, on the outer circumference thereof is achieved.

In the event that the tight fit between the jackets 14, 16, respectively, and the duct ends 10, 12, respectively, is achieved by means of laser welding or welding, the glue-fill-in-openings 84 are not necessary.

Figure 9:
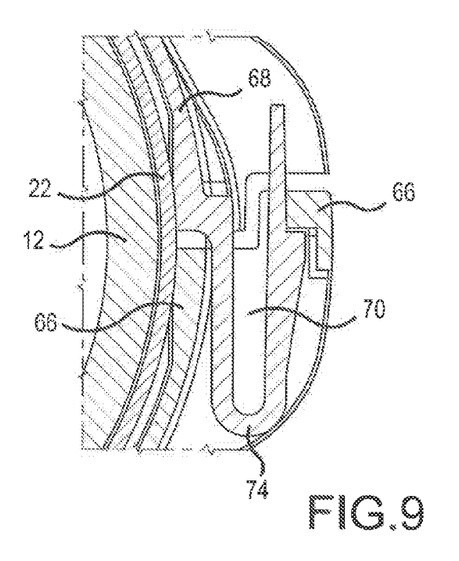
FIG. 9 shows a detail of the second embodiment of the coupling device according to FIG. 7.

FIG. 9 shows a detail of the second embodiment according to FIG. 7 as well as the first embodiment according to FIG. 4.

The first outer shell section 66 and the second outer shell section 68 are engaged with each other. For this purpose the hook-shaped elements 74 are introduced into openings 70 of the respective first and second outer shell sections 66, 68 engaged with one another to form an outer shell 20 surrounding the first jacket 14 and the second jacket 16 in its entirety, i.e. about 360°. Both shell sections 66, 68 are preferably identical parts. In FIG. 9 it is shown, that the second outer shell section's 68 comprises the hook-shaped element 74, engages the opening 70 of the second first shell section 66. Reference numeral 12, is the duct end surrounded by the combination of the first outer shell section 66 and the respective second outer shell section 68 forming the outer shell 20 in its entirety i.e. surrounding the jackets 14, 16 in an angle of about 360°.

Figure 10:
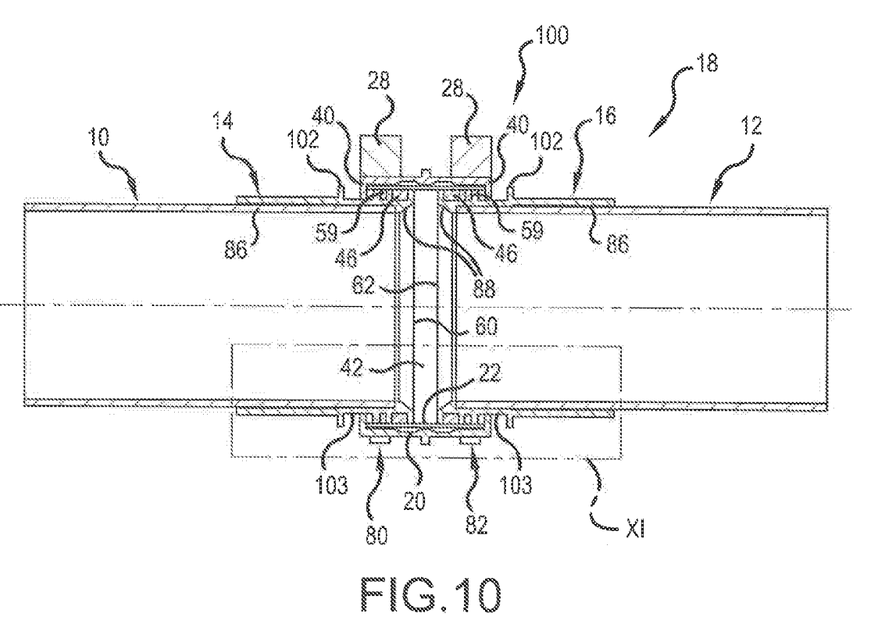
FIG. 10 shows a third embodiment of the coupling device according to the present invention sealing elements arranged on the outer circumference between radially extending ribs of the jackets.

FIG. 10 shows a further, third embodiment of the coupling device according to the present invention.

According to FIG. 10, a "four-rib"-design 100 is shown. With "four-rib" design 100 it is meant, that the jackets, i.e. the first jacket 14 and the second jacket 16 each comprise the first annular rib 50, the second annular rib 52, the third annular rib 54 as well as a further, i.e. fourth annular rib 102 in an axial distance space apart from the third annular rib 54. The coupling device 18 comprises the first cable tie 80 and the second cable tie arrangement 82 similar to the those of the coupling device 18 according to the second embodiment of the present invention.

Figure 11:
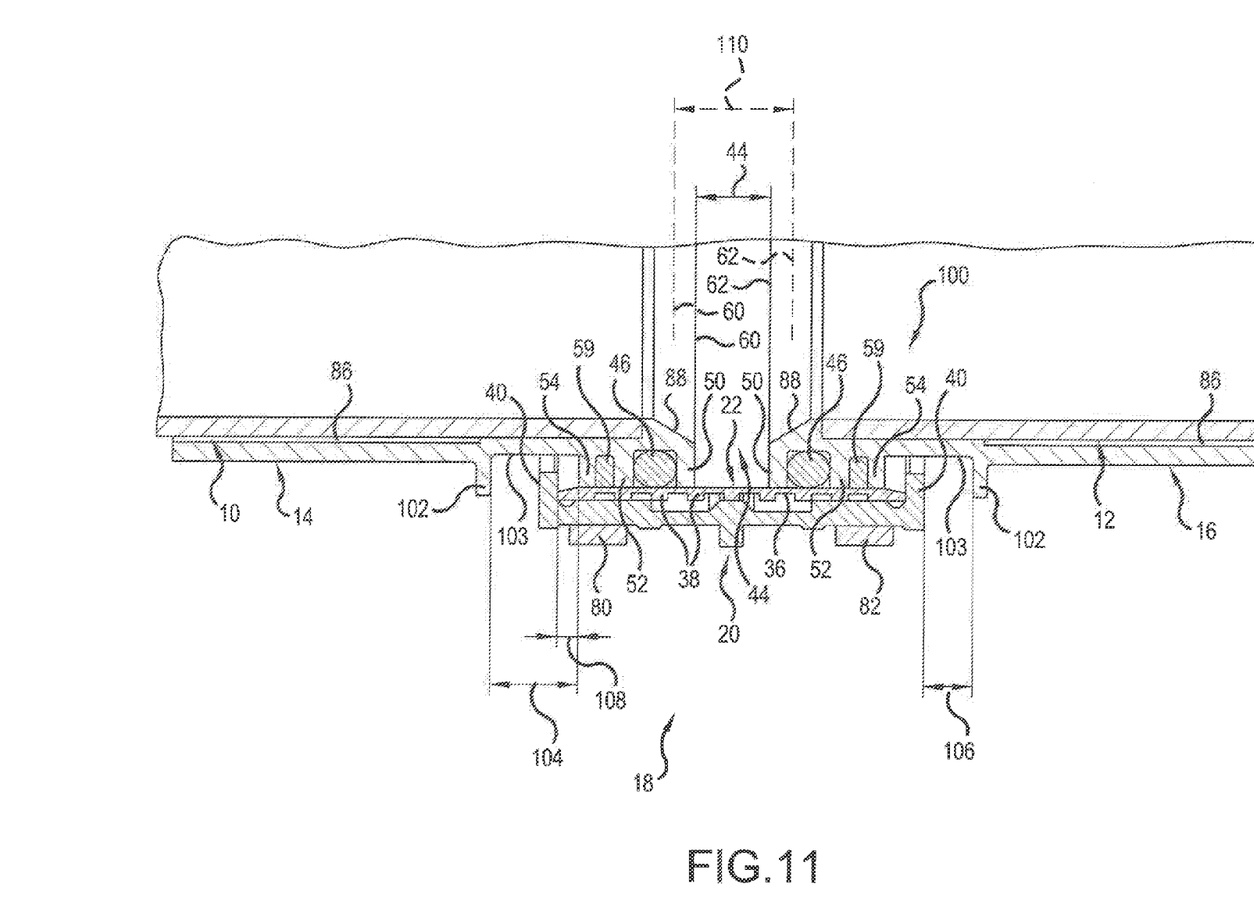
FIG. 11 shows in greater detail the coupling devices outer and inner shells and the sealing elements housed therein.

In the cross section given in greater detail in FIGS. 10 and 11, respectively, it is shown that the annular shaped first sealing element 46 as well as a further annular shaped sealing element 59 are arranged on the outer circumference of the jackets 14, 16. This means, that both sealing elements 46, 59 are being housed between ribs 50, 52, and 52, 54, respectively, provided on the outer circumference of the jackets 14, 16. Those are securely tightened to the duct ends 10, 12 of the ducts, transporting a liquid, such as fresh water, waste water, waste water containing solids or the like, fuel or a hydraulic fluidic aircraft applications.

In FIG. 10 it is revealed, that the endfaces 60, 62 of the duct ends 10, 12, respectively, are arranged having a gap 42 within each other which has a gap width 44. The gap 42 shown in FIG. 10 constitutes an insulation gap between the confronting duct ends 10, 12, respectively. It can be further derived from FIG. 10 that the end faces 60, 62 each comprise an inclined portion 88, which reduces a potential impact of solids or solid particles when contacting the end faces 60, 62, thus preventing mechanical damages thereof. In this third embodiment according to FIG. 10, the jackets 14, 16, respectively, comprise a fourth annular rib 102, which may be formed continuously or partially around the circumference of the jackets 14, 16, and which is being arranged in a distance with respect to the third annular rib, further annular rib 54 of the jackets 14, 16, respectively, according to the first and second embodiments, shown in FIGS. 1-9.

FIG. 10 reveals that according to the third embodiment of the present invention, the end faces 60, 62 of the duct ends 10, 12, respectively, are arranged with respect to one another forming a gap 42. A sealing function in this third embodiment of the coupling device 18 is performed by the first annular shaped sealing element 46 and a further annular shaped sealing element 59 establishing an electrical conductive connection for example. Reference numeral 103 identifies an axially extending recess, between the fourth and third annular shaped rib 54, i.e. the further annular rib provided on the jackets 14, 16, respectively, and a fourth annular rib 102, being likewise provided in circumferential direction on the circumferences of the first and second jackets 14, 16, respectively. According to the third embodiment given in FIG. 10, this arrangement may comprise the second sealing element 58 as shown in FIG. 1 and in a circumference of the jacket in a recess 56. Even when this detail is omitted in the embodiment according to FIG. 10, all three sealing elements having different functions may be used within the coupling device 18 according to the present invention. The sealing function between the end ducts 10, 12 can be performed by the first sealing element alone, whereas the establishment of an electrical conductive connection between the end ducts 10 and 12 and the inner shell 22, the outer shell 20 may be established by the third annular sealing element labeled with reference numeral 59. Detail XI shows the area of the third embodiment which is given in a larger scale in FIG. 11.

According to the cross-section given in FIG. 11 it becomes clear, that the first and second jackets 14, 16 are tightly fitted to the first and second duct end 10, 12, respectively. The first and second jackets 14, 16 each comprise the first annular rib 50, the second annular rib 52, the third annular rib 54 as well as the fourth annular rib 102. Between the first annular extending rib 50 and the second annular extending rib 52 the first annular shaped sealing element 46 is provided serving sealing purposes between the jacket 14, 16 and the inner shell 22 only. Between the second annular extending rib 52 and the third annular rib 54 the second annular extending sealing element 58 may be engaged, likewise serving sealing functions between the duct end 10, 12 and the jackets 14, 16. According to the cross section given in FIG. 11, the fourth annular rib 102 defines an axially extending recess 103 between the fourth annular extending rib 102 and the third i.e. further annular rib 54. This recess 103 is engaged by the radially inward extending ribs 40 or rib portions 40 of the outer shell 20.

Since the radially inward extending ribs 40 dive into the axial recess 103, a displacement of the end faces 60, 62, respectively, having the inclined portions 88 for preventing damage by collision of solids, of the duct ends 10, 12 in axial direction is possible without the sudden loss of the sealing function. Reference numeral 44 depicts a gap width of a gap 42 serving insulation purposes between the end faces 60, 62. In dotted lines, a theoretical maximum gap width 110 is indicated between the end faces 60, 62, respectively, when torn apart entirely in horizontal direction. The maximum gap width 110 is reached, when on both jackets 14, 16 with respect to the axially extending recess 103 the first width portion 106 reaches its maximum value and simultaneously the second width portion 108 becomes zero.

Figure 121:
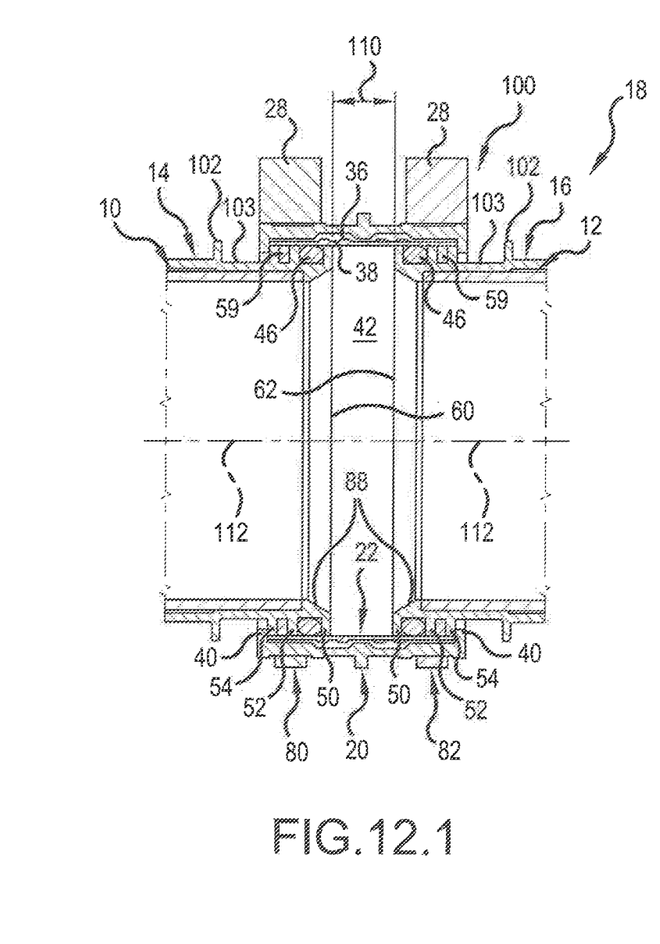

If, however, the second width portion 108 on both jackets 14, 16 adopts the value zero, then the coupling device 18 endeavors its maximum axial tension load and the mechanical force is transmitted by the following components: beginning with the first duct end 10 to the tightly mounted first jacket, further by the third annular rib 54 to the inner ribs 40 of the outer shell 20 via the other inner rib 40 at the opposite end of the outer shell 20 to the corresponding third annular rib 54 of the jacket 16 of the other duct end 12. This operating condition is best shown in FIG. 12.1.

In the case that the coupling is axial compression loaded, both first width portions 106 simultaneously intend to become zero, the gap width 44 reaches, before this occurs, the value zero. Therefore the load path can be easily determined as the following components:

Via first duct end 10, to first jacket 14 to the end face 60 of the first duct 10, the end face 62 of the second duct end 12 to the second jacket 16 and the second duct end 12.

In a third scenario the second width portion 108 becomes zero as well as the first width portion 106. Then an extreme asymmetrical position is reached. To limit this extreme asymmetrical position the fourth annular rib 102 pushes against the radially inward extending rib or rib portion 40 of the outer shell 20 to move the whole coupling 18 into a more an ideal position. In the various embodiments described heretofore, the annular-shaped sealing elements 46, 58 and 59 may serve different purposes, even in combination with each other:

The sealing elements listed above, i.e. components 46, 48 and 159, respectively, may be used for redundancy purposes as well as in the sense of a task separation. Whereas one of the three sealing elements serves the sealing function, the other one may establish electrical conductivity whereas the third sealing element may be arranged for redundancy purposes only. The sealing function concerns the separation of the medium transported and the glue, i.e. this is the case when the jackets 14, 16 are tightly fitted by means of an adhesive to the duct ends 10, 12. This separation of functions can thus be seen in connection with the second sealing element 58, when arranged in the inner recess as shown in the embodiment according to FIG. 3. In this embodiment according to FIG. 3 the second sealing element 58 has a sealing function between the duct ends 10, 12, i.e. the medium transported therein and the outer jackets 14, 16. If, however arranged on the outer circumference on the jackets 14, 16, the sealing element 59 may adopt the function of establishing electric conductivity. Both sealing elements i.e. the second sealing element 58 as well as the sealing element 59 may be used in a parallel i.e. at the same time in a coupling devise according to the present invention.

The ideal position of the coupling 18 according to the present invention will be realized during installation by adjusting the gap 42 to a predetermined value. During operation the coupling 18 compensates for axial as well as angular deformation as best shown in the following FIGS. 12.1 to 12.4. These deformations may occur from aircraft fuselage deformation, thermal expansion behavior or any other reason. While compensating deformations, the coupling 18 according to the present invention could reach one of the above-mentioned extreme positions. Especially when adopting an asymmetric position, the contact between the fourth annular rib 102 and the inner rib 40 or the inner rib portions limit the whole coupling 18 to move into another position. This adjustment are compensating property of the coupling 18 according to the present invention improves operation and durability.

In FIGS. 12.1-12.4 a variety of operating conditions is disclosed.

According to FIG. 12.1, the duct ends 10, 12 the first jacket 14 and the second jacket 16 are shown in a substantially horizontal orientation 112. In the operating conditions according to FIG. 12.1 the end faces 60, 62 of the duct ends 10, 12, respectively, form a maximum gap width 110, i.e. the flanges of the duct ends 10, 12 do not contact each other in this operating condition. The components 40 and 54 contact each other. In the embodiment given in FIG. 12.1 of the coupling device 18 the coupling device 18 is secured by the first cable tie 80 and the second cable tie arrangement 82, respectively. In the jackets 14, 16 the first annular shaped sealing element 46 as well as the second annular shaped sealing element 59 are arranged on the outer circumference of the jackets 14, 16, respectively, located between the first annular ribs 50, 52 and the second annular ribs 52 and third annular rib 54, respectively. Reference numeral 103 identifies a recess engaged by the inner ribs or inner annular rib portions 40 of the outer shell 20, 66, 68.

Figure 122:
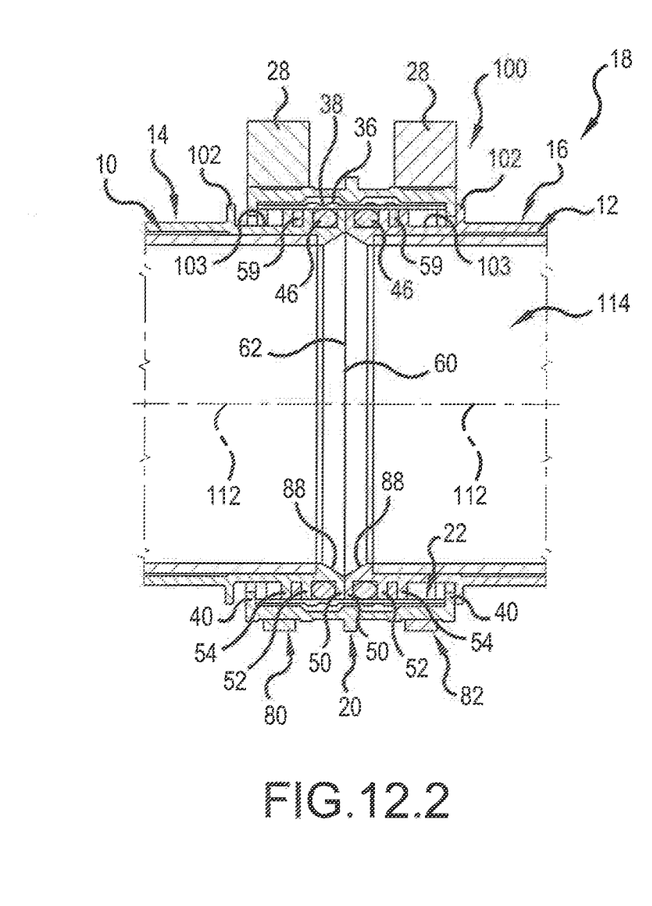

In FIG. 12.2 operating conditions of a third embodiment of the coupling device 18 according to the present invention are shown within which the end faces 60, 62 of the duct ends 10, 12, contact each other. This means, that in the third embodiment of the present invention, as shown in FIG. 12.2 the gap width 44 is zero, i.e. the flanges of the end faces 60, 62 of the duct ends 10, 12 provided with the respective jackets 14, 16 contact each other. Further, the fourth annular rib 102 and the radially inwardly extending rib 40 or rib portion 40 contact each other.

Both components i.e. the inner rib 40 or the inner rib portions 40 of the outer shell 20 as well as the fourth annular rib 102 prevent the coupling device 18 according to the present invention to move further into a asymmetrical position. The hypothetical theoretical ideal position of the coupling device 18 according to the present invention is best shown in FIG. 11.

A sealing function in this horizontal orientation 112 of the duct ends 10, 12 and the jackets 14, 16 respectively is performed by means of the annular shaped first sealing elements 46 and the second annular shaped sealing elements 59 provided on the jackets 14, 16 respectively. A cross-section of the sealing elements 46, 58 and 59 may be rectangular, circular, oval, square-shaped, X-shaped, or trapezoidal or triangular.

According to the operating instructions given in FIG. 12.2, it is clearly derivable that the jackets 14, 16 provided on the circumference of the jackets 14, 16 are arranged in a substantially horizontal orientation 112. According to FIG. 12.2 the radially inward extending ribs 40 arranged on the circumference of the outer shell 20 engage the fourth annular shape rib 102 provided on the outer circumference of the jackets 14, 16.

Figure 123:
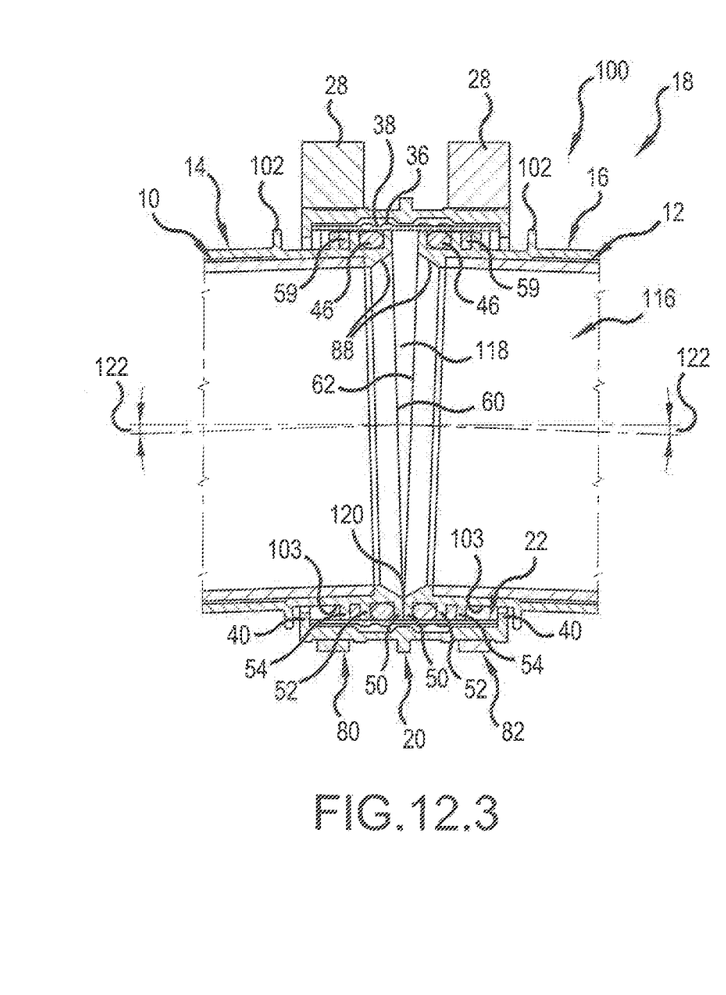
Figure 124:
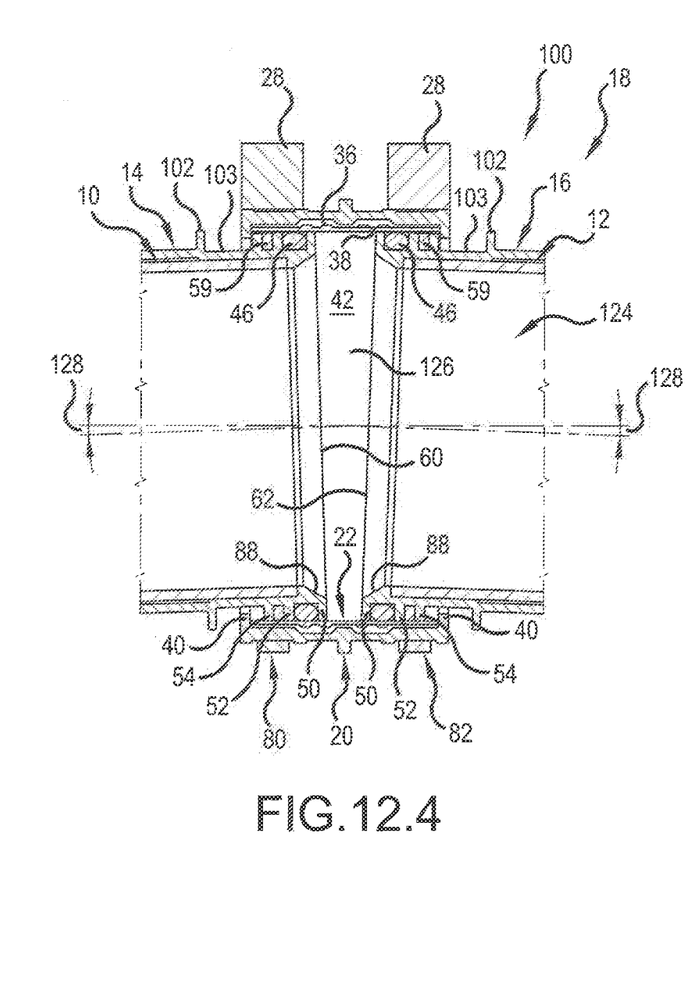

FIGS. 12.3 and 12.4, respectively, disclose operating conditions, within which, the jackets 14, 16 respectively, tightly secured to the outer circumference of the duct ends 10, 12, respectively, adopt angled orientations 116 and 124, respectively.

Operating conditions in FIG. 12.3 contacting flanges 120 show, that a triangular-shaped gap 118 is formed between the endfaces 60, 62 of the duct end 10, 12 respectively. This means, that according to these operating conditions of the coupling device 18 angular displacements are being compensated for by the coupling device 18, including the outer shell 20 and the inner shell 22, respectively. In the operating conditions shown in FIG. 12.3, the gap 42 between the end faces 60, 62 adopts a triangular shape, whereas in the operating conditions according to FIG. 12.4, the gap between the endfaces 60, 62 of the first duct ends 10 and the second duct end 12, respectively adopts a rather trapezoidal-shaped gap 126.

In the operating conditions according to the FIGS. 12.3 and 12.4 angular displacements of the end duct portions 10, 12 i.e. the jackets 14, 16 are shown in both variations i.e. having contacting flanges 120 as shown in FIG. 12.3 or having non-contacting flanges according to the trapezoidal-shaped gap 126 as shown in FIG. 12.4.

With respect to the present invention ducts in the sense of the present invention are to be understood as fluid-carrying ducts or pipes made of a non-metallic material, preferably high-performance thermoplastic material such as PEEK or PPS or another reinforced or not reinforced plastic or glass fibers comprising material. The fluid to be transported in the ducts according to the present invention may be water, waste water, water containing solids and/or particles, fuel or a hydraulic fluid for use within an aerospace or an aircraft application.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A coupling device for releasably connecting fluid-carrying duct ends of ducts, the coupling device comprising:
    jackets, connectable to the ends of each of the ducts, the jackets each comprising at least first and second annular ribs housing a first annular sealing element engaged by an inner shell; and
    an outer shell having at least one radially inward extending rib either arranged in an axial distance from a further annular rib of the jackets or engaging an axial recess of the jackets defined between the further annular rib and a fourth annular rib to center the inner shell and the outer shell in a position allowing for both an axial movement of said duct ends relative to one another and/or an angular movement of said duct ends relative to one another, independent from maintaining a fluid-tight connection at said first annular seating element, respectively, the outer shell comprising:
        two identical shell sections engaged with one another within respective connecting regions, each shell section comprising:
            an elastic hook-shaped element engaged by an opening of the other shell section, the elastic hook-shaped elements and the opening being disposed inside the two identical shell sections,
    wherein the coupling device is made of a high-performance thermoplastic material.

2. The coupling device according to claim 1, wherein the first annular sealing element is arranged in an outer recess of the jackets, and
    wherein a second annular sealing element is arranged within an inner recess of the jackets, respectively.

3. The coupling device according to claim 2, wherein the first and second annular sealing elements are arranged both on the circumference of the jackets.

4. The coupling device according to claim 2, wherein the second annular sealing element is mounted between the second annular rib and the further annular rib on the outer or inner circumferences of the jackets, respectively.

5. The coupling device according to claim 2, wherein the first and second annular sealing elements have a rectangular, a square, a triangular, a trapezoidal, an oval, a circular or a X-shaped cross-section.

6. The coupling device according to claim 2, wherein one of the first and second annular-sealing elements serves as a fluid sealing function, wherein one of the first and second annular sealing elements is provided for redundancy purposes, and wherein a third out of the sealing elements is used for establishing an electrical conductive connection.

7. The coupling device according to claim 1, wherein the duct ends are made of PEEK or PPS.

8. The coupling device according to claim 1, wherein the outer shell comprises annular extending ribs arranged in axial end portions of the outer shell.

9. The coupling device according to claim 8, wherein the annular extending ribs are arranged at the inner circumference of the outer shell.

10. The coupling device according to claim 1, wherein the outer shell is secured by at least one cable tie arrangement.

11. The coupling device according to claim 1, wherein the jackets comprise markers to determine the respective jacket's position with respect to the outer shell of the coupling device and/or a gap width of an insulation gap.

12. The coupling device according to claim 11 wherein the markers have a triangular shape and are arranged in a 60°-section on the outer surface of the jackets.

13. The coupling device according to claim 11 wherein the markers are printed or painted on the circumference of the jackets.

14. The coupling device according to claim 1, wherein the outer shell comprises a plurality of openings to allow for visibility of the inner shell.

15. The coupling device according to claim 1, wherein the inner shell comprises a ribbed structure provided on the outer circumference defining the mechanical stability or rigidity of the inner shell.

16. The coupling device according to claim 1, wherein the coupling device, the duct ends, the jackets, the outer shell, or the inner shell are made of PEEK or PPS.

17. The coupling device according to claim 1, wherein components of the coupling device, the duct ends, the jackets, the inner shell and the outer shell are made of a plastic material.

18. The coupling device according to claim 17, wherein the temperature range of the media-resistant, electrically conductive or isolating plastic material lies within the range of about −50° to 100°.

19. A system, comprising:
    a first duct;
    a second duct; and
    a coupling device for releasably connecting fluid-carrying duct ends of the first duct and the second duct, the ducts ends each carrying a jacket, the jackets each comprising at least first and second annular ribs housing a first annular sealing element engaged by an inner shell, the coupling device comprising:
    an outer shell having at least one radially inward extending rib either arranged in an axial distance from a further annular rib of the jackets or engaging an axial recess of the jackets defined between the further annular rib and a fourth annular rib to center the inner shell and the outer shell in a position allowing for both an axial movement of said duct ends relative to one another and/or an angular movement of said duct ends relative to one another, independent from maintaining a fluid-tight connection at said first annular seating element, respectively, the outer shell comprising:
        two identical shell sections engaged with one another within respective connecting regions, each shell section comprising:
            an elastic hook-shaped element engaged by an opening of the other shell section, the elastic hook-shaped elements and the opening being disposed inside the two identical shell sections,
    wherein the coupling device is made of a thermoplastic material.

20. A coupling device for releasably connecting fluid-carrying duct ends of ducts, the coupling device comprising:

jackets, connectable to the ends of each of the ducts, the jackets each comprising at least first and second annular ribs housing a first annular sealing element engaged by an inner shell; and an outer shell having at least one radially inward extending rib either arranged in an axial distance from a further annular rib of the jackets or engaging an axial recess of the jackets defined between the further annular rib and a fourth annular rib, the outer shell comprising:
  two identical shell sections engaged with one another within respective connecting regions, each shell section comprising:
    an elastic hook-shaped element engaged by an opening of the other shell section, the elastic hook-shaped elements and the opening being disposed inside the two identical shell sections.

* * * * *

UNITED STATES PATENT AND TRADEMARK OFFICE
CERTIFICATE OF CORRECTION

| | |
|---|---|
| PATENT NO. | : 9,611,959 B2 |
| APPLICATION NO. | : 13/542989 |
| DATED | : April 4, 2017 |
| INVENTOR(S) | : Hartmann et al. |

It is certified that error appears in the above-identified patent and that said Letters Patent is hereby corrected as shown below:

On the Title Page (75) Inventors show:
Juergen Hartmann, Mutterstadt (DE); Andreas Kaufmann, Speyer (DE); Stefan Gelbrich, Geithain (DE); Caroline Kauffmann, Roemerberg (DE)

It should show:
(75) Inventors: Juergen Hartmann, Mutterstadt (DE); Andreas Kaufmann, Speyer (DE); Stefan Gelbrich, Gilching (DE); Caroline Kauffmann, Roemerberg (DE)

Signed and Sealed this
Sixteenth Day of May, 2017

Michelle K. Lee
*Director of the United States Patent and Trademark Office*